United States Patent [19]

Kneib et al.

[11] Patent Number: 4,619,477
[45] Date of Patent: Oct. 28, 1986

[54] MOTOR VEHICLE DOOR INTERIOR LINING EQUIPPED WITH A STORAGE POCKET

[75] Inventors: Rudi Kneib; Ludwig Emmer; Peter Robitschko, all of Sindelfingen, Fed. Rep. of Germany

[73] Assignee: Daimler-Benz Aktiengesellschaft, Stuttgart, Fed. Rep. of Germany

[21] Appl. No.: 707,812

[22] Filed: Mar. 5, 1985

[30] Foreign Application Priority Data

Mar. 9, 1984 [DE] Fed. Rep. of Germany ....... 3408611

[51] Int. Cl.$^4$ .............................................. B60R 7/04
[52] U.S. Cl. .................................. 296/37.13; 296/152
[58] Field of Search ............................ 296/37.13, 152

[56] References Cited

U.S. PATENT DOCUMENTS

| 1,995,143 | 3/1935 | Burch | 296/37.13 |
| 2,019,674 | 11/1935 | Graebner | 296/37.13 |
| 3,730,581 | 5/1973 | Parkinson | 296/37.13 |
| 4,453,760 | 6/1984 | Hira | 296/37.13 |

FOREIGN PATENT DOCUMENTS 1095685 12/1960 Fed. Rep. of Germany .

*Primary Examiner*—Robert R. Song
*Attorney, Agent, or Firm*—Barnes & Thornburg

[57] ABSTRACT

To enable components accommodated in a door cavity of a motor vehicle to be reached conveniently without removing the entire door interior lining, the latter exhibits, at the rear of a storage pocket, an aperture closable by a wall, the wall being removable towards the interior of the vehicle after releasing at least one fastening element—so as to expose an assembly aperture in the door interior plate.

11 Claims, 3 Drawing Figures

MOTOR VEHICLE DOOR INTERIOR LINING EQUIPPED WITH A STORAGE POCKET

The invention relates to a door interior lining equipped with a storage pocket in a motor vehicle, wherein the door interior lining exhibits to the rear of the storage pocket an aperture which is closed by a wall forming the rear wall of the storage pocket.

A storage pocket associated in this manner with a door interior lining is known from German Ausleges- chrift No. 1,095,685, wherein the storage pocket conjointly with its rear wall is anchored at the rear side of the door interior lining and the door interior lining is then fastened to the door interior plate. If maintenance or repair operations to components accommodated in the door cavity, such as window controls or closing devices, are required, then it is always necessary for the door interior lining conjointly with the storage pocket to be removed, which is however only possible if attached parts and operating elements, for example in the form of cranks, switches and locking elements, which penetrate the door interior lining, are previously removed.

An object of the invention is to disclose a method and apparatus which makes it possible, even without disassembling the door interior lining, to reach components arranged behind the latter.

This object is achieved by provision of a door interior lining equipped with a storage pocket in a motor vehicle, wherein the door interior lining exhibits at the rear of the storage pocket an aperture which is closed by a wall forming the rear wall of the storage pocket, the wall being removable towards the interior of the vehicle after releasing at least one fastening element exposing an assembly aperture.

In an exemplary embodiment of the invention the bottom region of the storage pocket on the inside of the door, conjointly with an adjacent door interior plate, forms a housing recess for the wall, whereby an accurately fitting assembly with simple anchorage in the lower wall region is achieved.

Particularly good accessibility is achieved if the wall is removable conjointly with the preferably integrally shaped storage pocket.

The fastening element may be constructed as a clip and shaped integrally on the wall.

Particularly in the case of an independently removable wall, an easy removal of the same is achieved if the wall terminates in at least one handle recess at the top.

If the wall exhibits housings for lines and/or components on its rear side, then these are brought into a favorably accessible position when the wall is removed, and can consequently be checked particularly easily.

These and other objects, features, and advantages of the present invention will become more apparent from the following description when taken in connection with the accompanying drawing which shows, for the purposes of illustration only one embodiment in accordance with the present invention, and wherein:

FIG. 1 shows a first exemplary embodiment with removable wall and with clip connection plugged through;

Figure 2:
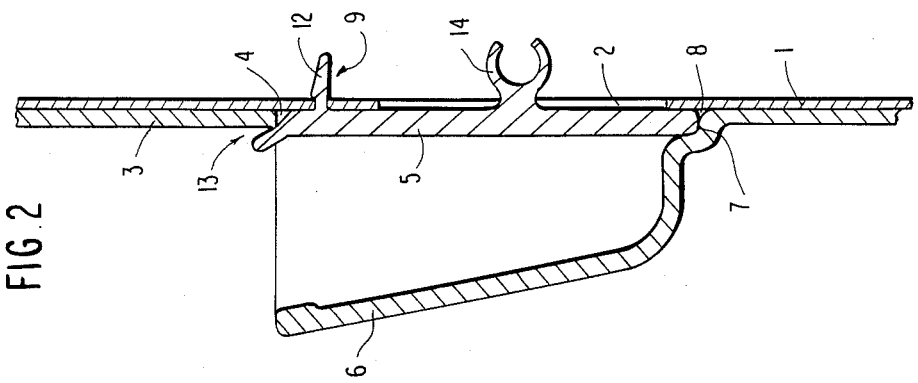
FIG. 2 shows a further exemplary embodiment, again with an independently removable wall nd with an integrally shaped clip connection.
Figure 1:
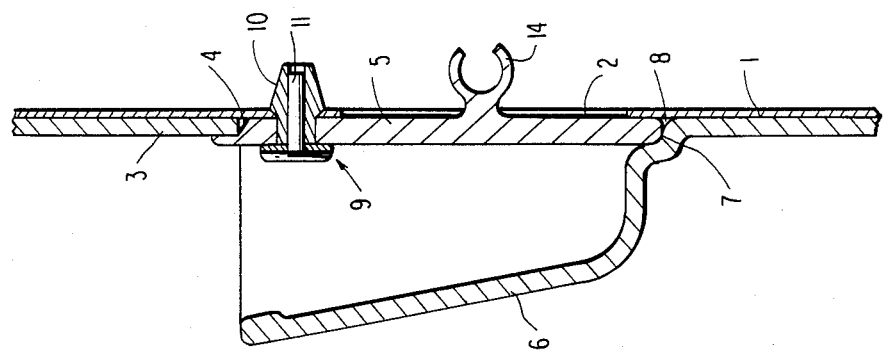

Referring now to the drawings wherein like reference numerals represent like structural elements, and more particularly to FIG. 1 there is shown a door interior plate 1 of a motor vehicle door, not illustrated in further detail, exhibiting an assembly aperture 2 and provided towards the interior of the vehicle with a door interior lining 3. An aperture 4, which is let into the door interior lining 3, is closable by a removable plate 5. This plate 5 forms the rear wall of a storage pocket 6 projecting from the door interior lining 3, which according to FIGS. 1 and 2 is shaped integrally on the door interior lining 3. The bottom region 7 on the door side conjointly with the adjacent door interior plate 1 forms a housing recess 8 for the removable plate 5, which according to the exemplary embodiment of FIG. 1 is anchored releasably to the door interior plate 1 by means of a fastening element 9 in the form of a clip 10 plugged through door interior plate 1. The clip 10 exhibits a withdrawable bolt region 11, after the removal of which the part of the clip 10 still remaining is removable conjointly with the plate 5.

As may be seen from FIG. 2, a fastening element 9 constructed as a clip 12 is shaped integrally on the plate 5 in this case, and the latter is provided at the top with a hand recess 13 which forms a handle for removing the plate 5.

Figure 3:
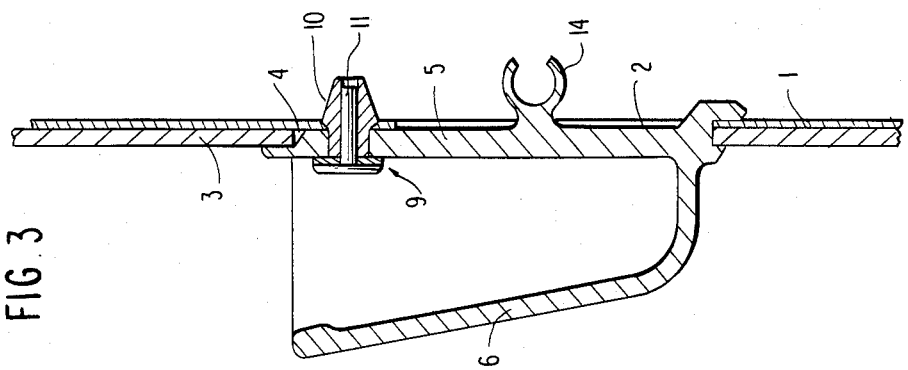
FIG. 3 shows a third exemplary embodiment, in which the storage pocket is shaped integrally on the wall.

In the exemplary embodiment according to FIG. 3, the fastening element 9 of which corresponds to that of FIG. 1, the plate 5 and the storage pocket 6 are constructed integrally, so that after their removal it is possible to manipulate components, not shown, accommodated in the interior space of the door with particular ease.

In all three exemplary embodiments, FIGS. 1-3, a housing 14 projects from the plate 5 on the side of the door interior space, which is illustrated as representing a plurality of housings, including different types, and can house releasably lines or components, not shown. The lines or components are then directly accessible after the respective plate 5 is hinged away.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. In a motor vehicle, a door interior lining having an assembly aperture and equipped with a storage pocket congruent therewith, comprising
   a plate means forming a rear wall of the storage pocket and releasably fastened within said aperture,
   at least one releasable fastening means for effecting removal of at least the plate means towards the interior of the vehicle after release of said at least one fastening means to expose said assembly aperture.

2. A door interior lining with storage pocket according to claim 1, further comprising a bottom region of the storage pocket on the door side for forming conjointly with an adjacent door interior plate, a houding recess for the plate means.

3. A door interior lining comprising
a door plate having an assembly aperture,
a storage pocket having a plate means integral with and forming a rear wall of the storage pocket mounted to said plate congruent with said assembly aperture, the plate means mounted to the door interior lining for conjoint removal with the storage pocket from the door interior lining.

4. A door interior lining with storage pocket according to claim 1, wherein the fastening means comprises a clip.

5. A door interior lining with storage pocket according to claim 4, wherein the clip is integral to the plate means.

6. A door interior lining with storage pocket according to claim 1, wherein the wall terminates in at least one hand recess at its top.

7. A door interior lining with storage pocket according to claim 1, further comprising at least one housing mounted to the side of the plate means remote from the pocket for receiving lines and/or components.

8. Apparatus for a door having a door interior plate and a door interior lining contiguous to the door interior plate with congruent apertures in said door interior plate and door interior lining comprising
a storage pocket congruent with said aperture,
plate means to serve as a rear wall of the storage pocket and disposed within the apertures, and
means for mounting the plate means to the door interior plate and for removing the plate means from the door interior plate toward the interior of the vehicle without removing the door interior lining.

9. Apparatus according to claim 8, wherein the means for mounting the plate to the door interior means comprises a clip.

10. Apparatus according to claim 9, wherein the clip is integral to the means.

11. Apparatus according to claim 8, wherein the storage pocket is integral to the door interior lining.

* * * * *